Patented Oct. 2, 1923.

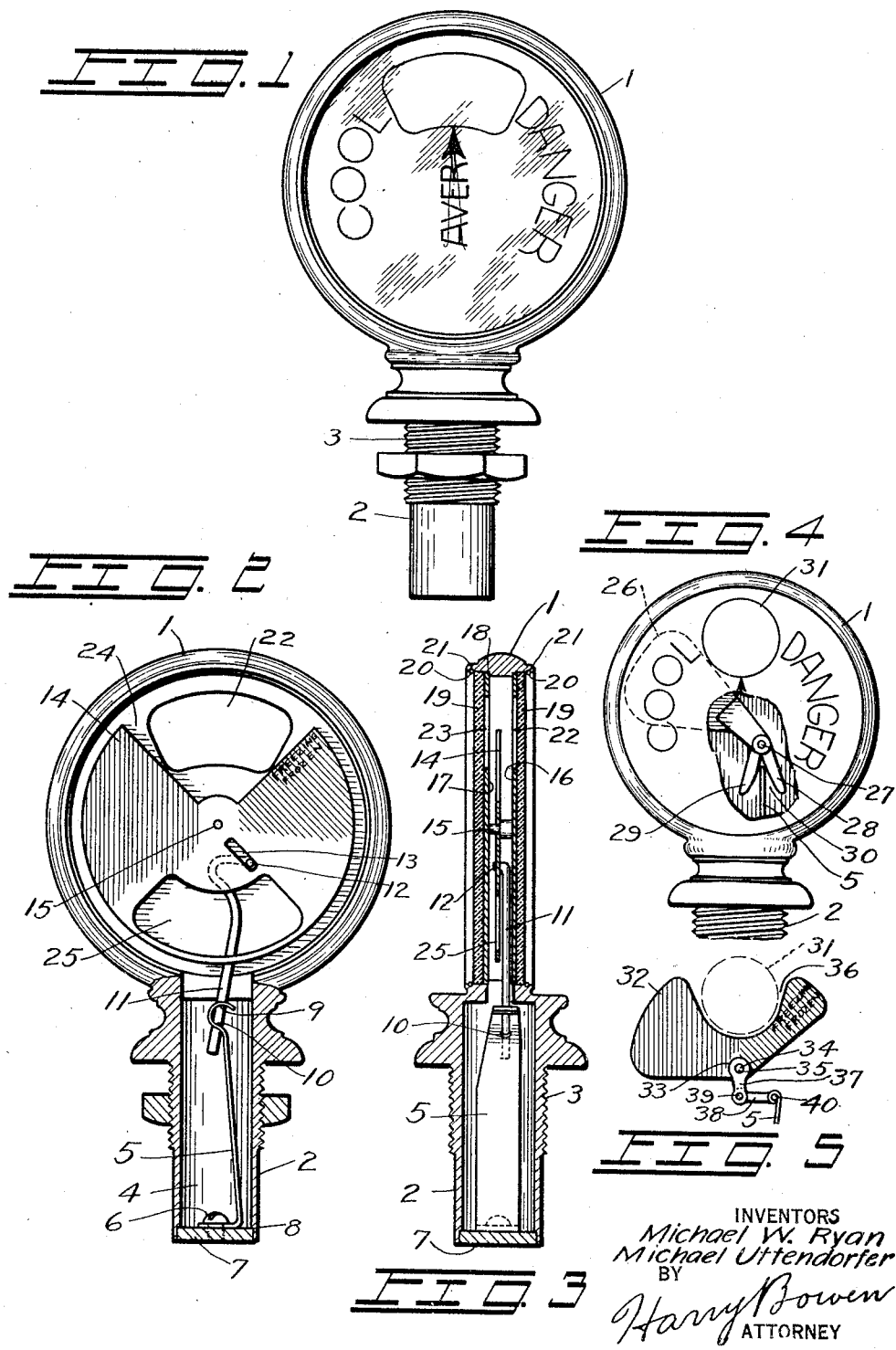

1,469,445

UNITED STATES PATENT OFFICE.

MICHAEL W. RYAN AND MICHAEL UTTENDORFER, OF SEATTLE, WASHINGTON.

RADIATOR METER.

Application filed January 6, 1922. Serial No. 527,466.

*To all whom it may concern:*

Be it known that we, MICHAEL W. RYAN and MICHAEL UTTENDORFER, citizens of the United States, residing at Seattle, county of King, and State of Washington, have invented a new and useful Radiator Meter; and we do hereby declare that the following is a full, clear, and exact specification, such as will enable others skilled in the art to which it appertains to make and use the same.

The invention is a device which may be screwed into the top of a radiator cap by which the driver of the automobile may determine the approximate temperature of the water in the radiator.

The object of the invention is to provide a device for indicating the approximate temperature of the water in an automobile radiator in which is a disc which is operated by a vertical piece of thermostatic metal so that it will rotate and appear in a hole through the device.

Another object of the invention is to provide a device which may be placed on the radiator of an automobile by which the driver may readily determine the rise of the temperature in the radiator in which is an indicator operated by a piece of thermostatic material inside of a casing projecting down into the top of the radiator.

And a still further object of the invention is to provide a device with an indicator inside of it operated by a piece of thermostatic material which as the temperature rises will rotate the indicator in one direction and as the temperature falls will rotate the indicator in the opposite direction.

With these ends in view the invention embodies a casing with a threaded shank on its lower side which may be screwed into the top of a radiator cap having a movable disc or blade pivotally mounted in the casing and a piece of thermostatic material mounted in the lower part of the casing the upper end of which is suitably connected to the disc or blade so that as the temperature affects the piece of thermostatic material it will cause the disc or blade to rotate.

Other features and advantages of the invention will appear from the following description taken in connection with the drawings, wherein:—

Figure 1 is a front elevation.

Figure 2 is a front elevation with the glass and first disc removed and the lower part broken away on the center line.

Figure 3 is a cross section on the center line.

Figure 4 is a front elevation with part broken away showing an alternate means for operating the blade by the piece of thermostatic material.

Figure 5 is a part section showing another alternate means of connecting the thermostatic material to the blade.

In the drawings we have shown our meter as it would appear in use in Figure 1 wherein, numeral 1 indicates the casing which has a shank 2 on its lower side on which are the threads 3 by which it may be screwed into the top of the radiator cap. Inside of the shank 2 is a cylindrical hole 4 in which is a piece of thermostatic material 5 which is constructed of two thin pieces of metal having different coefficients of expansion so that as its temperature is raised one of the metals will expand more than the other and cause its free end to move in an arc about its fixed end. The lower end of the thermostatic material 5 is held by a screw 6 to a plate 7 which is fastened in a recess 8 at the lower end of the shank 2. The upper end of the thermostatic piece of material 5 is bent in the shape of a U as shown in Figure 2 and has two holes 9 and 10 through the sides of the U through which the rod 11 passes and is frictionally held by bending the outer end of the U slightly outward. The upper end of the rod 11 may be bent as shown in Figure 2 and has a projection 12 on it which projects through a slot 13 in a disc 14 and this disc is pivotally mounted on a pin 15 in the upper part of the casing 1. This pin is held on a disc 16 which is fastened in the casing and on the opposite side of the disc 14 is another disc 17 similar to the disc 16. The disc 17 fits in the recess 18 so that it may be removed and on the outside of the discs 16 and 17 are pieces of glass 19 which are held in place by wires 20 in notches 21 in the casing 1.

The discs 16 and 17 have openings 22 and 23 in them and the disc 14 has a section 24 cut out to clear the openings 22 and 23. The lower side of the disc 14 has another opening 25 in it to correspond with the opening 24 so that it will balance. One side of the disc 14 may be colored red and the opposite side green as shown in Figure 2 and on the green side the words "freezing" and "frozen" may appear.

In the arrangement shown in Figure 4 the blade 26 corresponding to the disc 14 may be mounted upon a pin 27 which may be held in the casing and the lower side of the blade 26 may have two lugs 28 and 29 projecting downward on it forming a V shaped groove 30 into which the upper end of the piece of thermostatic material may project. When the temperature rises the piece of thermostatic material will move laterally and cause the blade 26 to rotate so that it will appear through the opening 31. The blade 26 may be made with a section on the opposite side of the hole 31 so that as the temperature falls and the end of the thermostatic material moves in the opposite direction the opposite section of the blade 26 which may be of a different color will appear on the opposite side of the opening 31.

In the arrangement shown in Figure 5 the blade 32 corresponding to the disc 14 may be made with a hub 33 on it in which is a hole 34 which is rotatably mounted on the pin 35 in the casing. In the upper side of the blade 32 is an opening 36 which permits the opening 31 to be fully open when the blade is in the position shown. On the lower side of the hub 33 is a projection 37, the lower end of which is connected to a bar 38 through a pin 39. The opposite end of the bar 38 is connected by a pin 40 to the upper end of the thermostatic material. In this arrangement the upper end of the thermostatic material which moves laterally when the temperature changes causes the blade 32 to rotate and appear through the opening 31.

It will be understood that changes in the construction can be made without departing from the spirit of the invention. One of which changes may be in the method of connecting the upper or free end of the piece of thermostatic material to the blade. Another may be in the shape of the blade, another may be in the use of different words on the discs 16 and 17 or on the blade, another may be in the shape of the opening through the casing or the use of two holes instead of one and still another may be in the design or shape of the casing.

The construction will be readily understood from the foregoing description. To use the device it may be placed in the top of an automobile radiator cap and as the temperature changes the upper or free end of the thermostatic material will move laterally and cause the disc or blade to rotate about its pivot so that it will show through the opening and inform the driver of the change in the temperature of the water.

Having thus described the invention what we claim as new and desire to secure by Letters Patent is:—

A device for indicating the temperature of the water in a motor vehicle radiator having a plate with openings in it pivoted in a casing that has windows through it to correspond with the openings in the plate when the plate is in the normal position, said casing having a tubular shaped section projecting from its lower side, which section is threaded at its exterior; a piece of thermostatic material standing practically vertical in the tubular shaped section and having its lower end attached to the lower end of the section which is closed; a bar attached to the upper end of the thermostatic element and having its free end bent at right angles and projecting through a slotted hole in the plate that is pivoted in the casing; and indications on the plate which will show through the openings in the casing as the plate is rotated by the lateral motion resulting from the expansion and contraction of the thermostatic element.

MICHAEL W. RYAN.
MICHAEL UTTENDORFER.